Feb. 22, 1927. 1,618,655
O. G. HALVORSEN
COMBINED PACKING AND THRUST BEARING FOR REVOLVING SHAFTS
Filed Oct. 6, 1923 3 Sheets-Sheet 1

Witness:
A. J. Sauser

Inventor:
Ole G. Halvorsen,
By Harvey L. Hanson
Attorney.

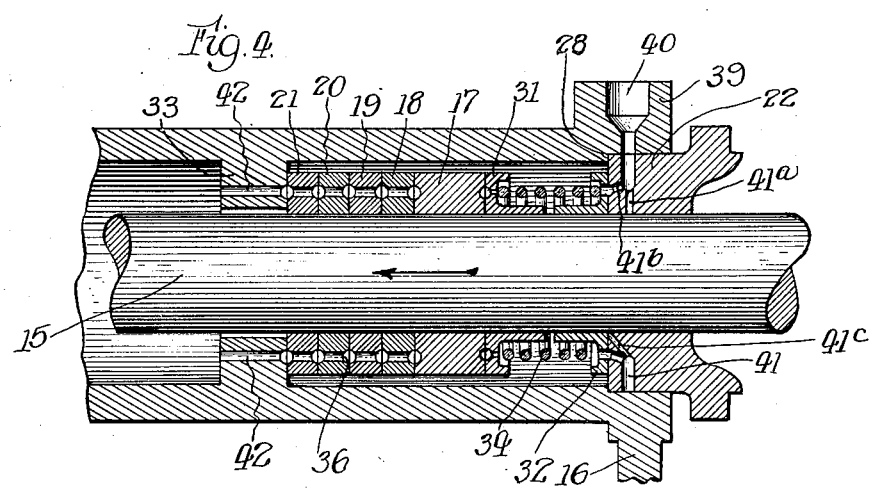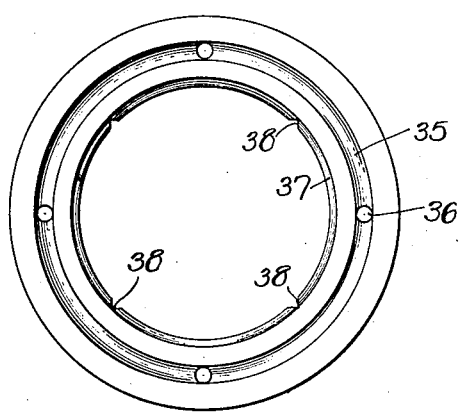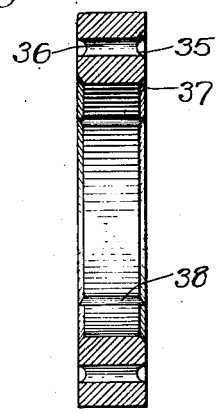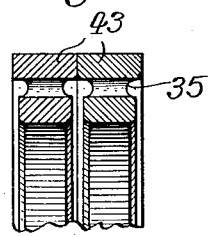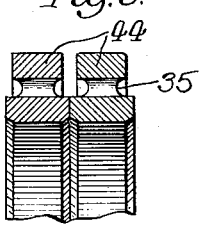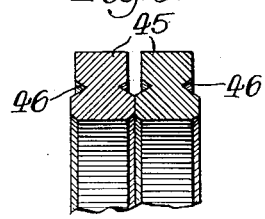

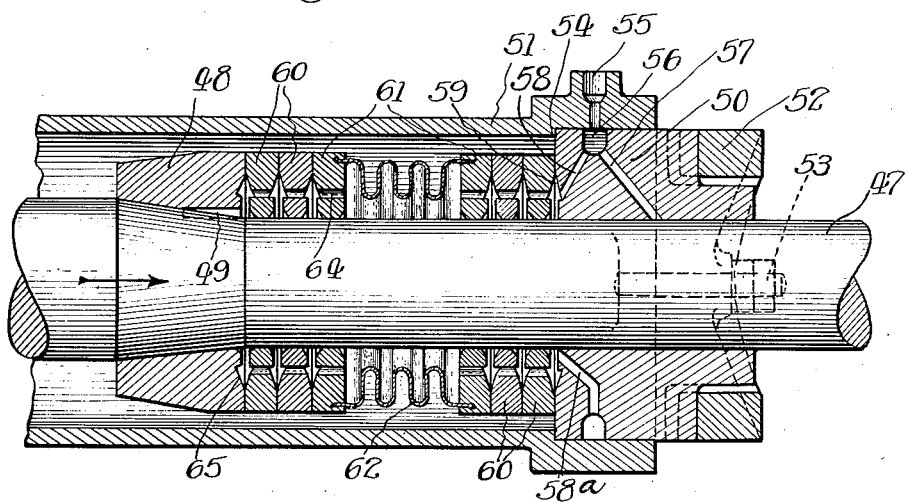

Patented Feb. 22, 1927.

UNITED STATES PATENT OFFICE.

OLE G. HALVORSEN, OF CHICAGO, ILLINOIS.

COMBINED PACKING AND THRUST BEARING FOR REVOLVING SHAFTS.

Application filed October 6, 1923, Serial No. 666,881, and in France October 7, 1922.

The invention relates to an improved stuffing box packing and axial thrust bearing for use with rotating shafts and more particularly to metallic packing and axial thrust bearing adapted for use with shafts which project through division, partition or containing walls into a fluid in which the shaft operates.

The device is especially adapted for use on the operating shafts of mixing tanks, agitators, centrifugal pumps, rotary compressors, ventilators and other circulating apparatus, as well as on the propeller shafts of ships where the shaft may be subjected to axial thrusts of varying intensities in both directions and the fluid on which it operates is necessarily confined to one side of the containing wall. Such conditions of service require the packing to be adapted as a thrust bearing as well as to prevent leakage of the fluid around the shaft and through the wall, with the result that the contacting surfaces must necessarily rotate relatively to each other under a pressure which tends to wear the bearing surfaces rapidly, and requires the expenditure of a considerable portion of the power, which would otherwise be available for rotating the shaft, to be employed in overcoming the friction in the packing.

In its preferred form, the invention provides for mounting a plurality of rings on the shaft in lateral contact, in such a manner that a shoulder on the shaft transmits all of the axial thrust of the shaft through the rings successively into the boxing or wall in which the shaft is mounted, the rings being free to slide on the shaft and to rotate relative to the shaft and to each other, and being arranged to act as a unit to distribute the thrust uniformly over the bearing. The number of the rings which are provided will depend upon the diameter and rotary speed of the shaft, as well as the amount of axial thrust, advantage being taken of the fact that the rings being rotatable relative to each other, will rotate at different speeds, the rate of rotation of the ring bearing against the collar being the greatest, and of the ring bearing against the boxing or wall being the least, and the rate of rotation of the intermediate rings being stepped down successively. The friction is thus distributed over the contacting faces of the various rings and its amount on any one surface is proportionately reduced. It is well known to those familiar with the art that the friction varies with the speed with which such contacting surfaces move each relatively to the other and the pressure between the bearing surfaces, and it is one of the objects of the invention to provide a combined packing and thrust bearing of the class described, which minimizes and uniformly distributes the friction necessarily existing between the contacting surfaces of the relatively moving parts.

The stuffing boxes usually provided for such bearings are cumbersome, expensive and difficult to adjust to compensate for the wear. The combination of rings above referred to have their contacting surfaces ground and finished, and are held in close contact by the thrust from the shaft so that the tank or lubricating fluids are prevented from passing between the rings, and another object is the provision of a fluid tight packing for rotating shafts which automatically adjusts itself to the wear incident to operation of the shaft.

A further object is the provision of a combined fluid tight packing and thrust bearing for rotating shafts which is equally effective, regardless of the intensity or reversal of the axial pressure on the shaft.

A still further object is to provide an improved means for lubricating the packing.

A still further object is to provide a packing of the class described which can be economically constructed and easily mounted on a shaft.

The foregoing and other detailed objects will appear in the following detailed description.

Referring now to the accompanying drawings which illustrate certain preferred embodiments of the invention:

Fig. 4 is a sectional view of the device, similar to that illustrated in Fig. 1, but differing therefrom in being constructed to transmit axial thrust normally acting in the opposite direction.

Figs. 5 and 6 are elevational and sectional views respectively, on a larger scale, of the packing rings shown in Figs. 1 and 4.

Figs. 7, 8 and 9 are details, on the same scale as Figs. 5 and 6, of alternative forms of packing rings.

Fig. 10 is a vertical sectional view of a shaft and packing box equipped with an alternative embodiment of my invention, and, Figs. 11, 12 and 13 are detail views on a larger scale of portions of the device shown in Fig. 10.

Figure 1:
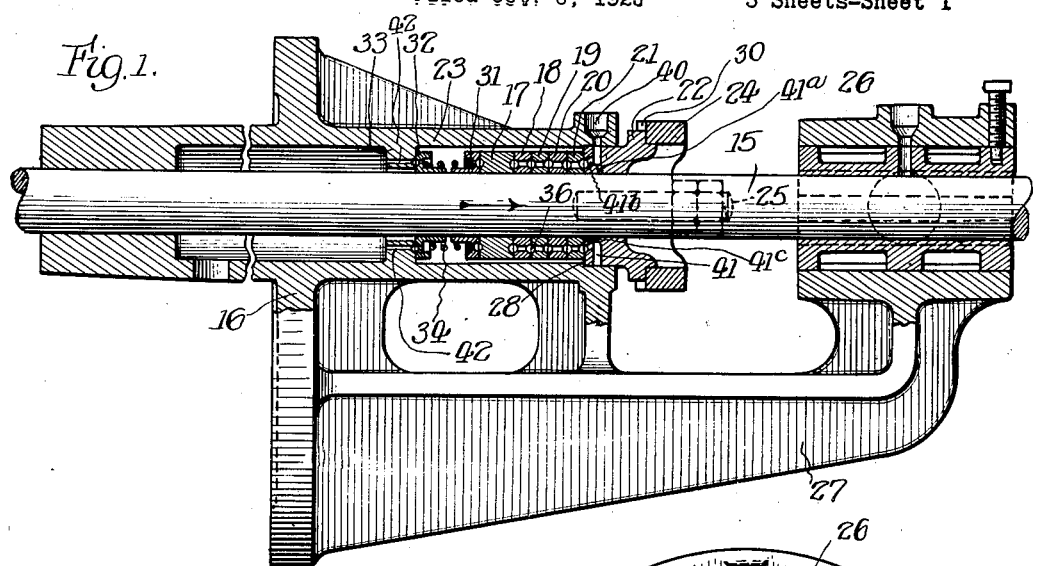
Fig. 1 is a vertical sectional view of a shaft and packing box equipped with the devices of my invention.
Figure 2:
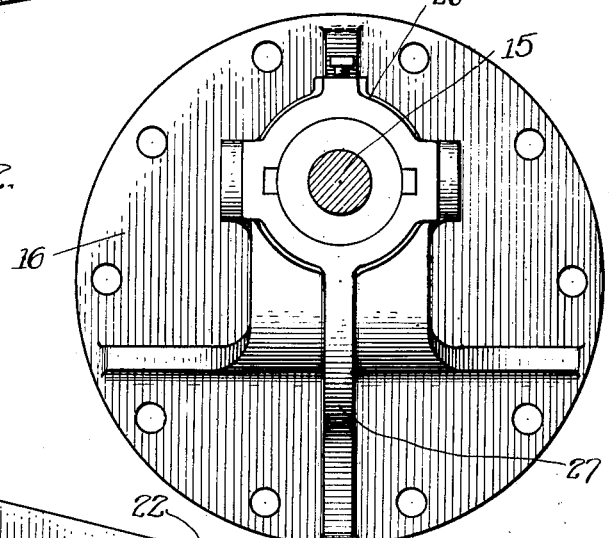
Figs. 2 and 3 are end elevational and plan views respectively, of the embodiment shown in Fig. 1.

A rotatable shaft 15 is mounted as shown in Fig. 1, in a housing having a flanged portion 16, and is adapted to be secured to a partition or wall of a tank, (not shown) containing the fluid to be agitated or propelled. Neither the end of the shaft projecting into the tank nor its opposite end to which the operating mechanism is connected are shown, it not being considered necessary to the proper disclosure of the invention that they be shown and for the same reason the stirrer or agitating device mounted on the tank end of the shaft is omitted. As is well known in the art, the mixing devices or propellers which are mounted on the shaft usually comprise diagonally extending vanes or augur shaped members which are revolved through the fluid when the shaft is rotated and which by reason of their shape and inclination to the axis of revolution transmit an unbalanced thrust to the shaft in an axial direction, the thrust acting in one direction along the shaft when the shaft is rotated in one direction and acting in the opposite direction when the shaft is correspondingly operated in the opposite direction. In Fig. 1 the direction of this thrust is indicated as tending to force the shaft to the right while in Fig. 4 the direction of the thrust is indicated as tending to force the shaft to the left. The shaft is steadied and held in exact axial alinement with the bearings mounted in the outer housing 23 by providing the well known form of bearing 26 which in turn is supported by the bracket 27.

Movement of the shaft 15 in the direction of the thrust is prevented by a collar 17 fixedly mounted upon or forming an integral part of the shaft. The collar bears against a ring 18 which is one of a plurality of similar laterally adjacent rings which are also mounted upon the shaft. The rings are adapted to slide upon and rotate freely about the shaft 15 and relatively to each other.

In Fig. 1 the thrust from the shaft 15 is transmitted through the collar 17, the rings 18, 19, 20 and 21 respectively, and into a bushing 22 which is fastened to the outer housing 23 by means of a gland 24 and of the bolts 25.

Figure 3:
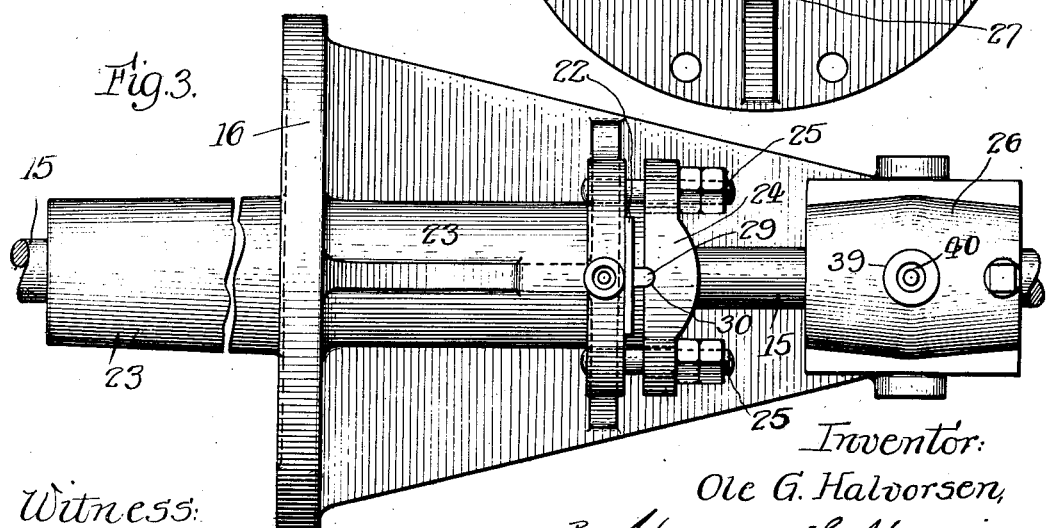

The lateral face of the bushing 22 against which the ring 21 bears, is conveniently finished and ground and also makes a tight joint with a seat 28 in the housing 23. In Fig. 3 the bushing 22 is shown as provided with lugs 29, the purpose of which is to receive the pressure from the gland 24 in order to hold the bushing tightly on the seat 28, the gland being provided with corresponding grooves 30 in which the lugs are seated.

On the other side of the collar 17 from the rings, a pair of sleeve 31 and 32 are mounted on the shaft 15 between the collar and a shoulder 33, which forms a portion of the housing 23. A spring 34 mounted on the shaft 15 presses the sleeves 31 and 32 against the collar 17 and the shoulder 33 respectively, the spring thereby serving to hold the rings in close contact and to press the ring 21 against the bushing 22 when the shaft is standing still.

The ring 18, 19, 20 and 21 are each finished and ground on their lateral surfaces and provided with a circular groove 35 on each lateral surface. In case rings of relatively large diameter are used, the rings may be constructed in sections if desired and two or more of these grooves may be provided on each lateral face if necessary, the required number being dependent upon the lubrication requirements and this in turn being dependent upon the size of the rings as well as the axial pressure and speed of the shaft. The grooves 35 on the different rings match each other and are brought into communication with one another and with the fixed shoulder 33 and the bushing 22 by means of channels 36 which connect the corresponding grooves 35 of each ring. The number of channels 36 which are provided can also be varied to suit the lubrication requirements. The sleeves 31 and 32 are provided with grooves 35 on their bearing surfaces and with channels 36 similar to the grooves and channels in the rings. The inner edges of the rings 18, 19, 20 and 21 are provided with bevels 37 and with axially extending grooves 38. The housing 23 is provided with a boss 39 which is apertured to receive an oil cup or pipe 40 communicating with a circular groove 41 which is formed in the bushing 22. This circular groove 41 communicates with the inner side of the bushing by means of the channels 41$^a$ for lubricating the shaft 15 on its cylindrical surface. From the circular groove 41 additional channels 41$^b$ communicate with the circular grooves 35 in the inner side of the bushing 22 and the corresponding circular groove in the adjacent ring. Channels 41$^c$ communicate with the circular groove 41 in the bushing 22 and extend to the inner edge of the bushing 22.

Where the axial thrust is normally acting in a direction from the outside towards the interior of the tank, the disposition of the rings, 18, 19, 20 and 21, and of the sleeves 31 and 32 relative to the collar 17 is as shown in Fig. 4 which, it will be noted, is the opposite to that shown in Fig. 1, the sleeves being placed between the collar 17 and the bushing 22 and the rings between the collar and the shoulder 33. In this position the thrust from the shaft is taken by the shoulder 33 and the bushing 22 is normally subjected only to the pressure from the spring 34, acting through the sleeve 32.

In the device as shown in Fig. 1 the fluid contained in the tank may flow through channels 42 formed in the shoulder 33 and fill the open spaces between the housing 23 and the sleeves, collar and rings, thereby serving as a lubricant and to lower the temperature otherwise caused by the friction of the rotating members. As shown in Fig. 1, the fluid is prevented from passing between the shaft 15 and the bushing 22 by the pressure of the ring 21 against the bushing and the tight fit therebetween occasioned by the finished contacting surfaces. The fluid is also prevented from passing between the end of the housing 23 and the bushing 22 by means of the ground seat 28, shown in Fig. 4, against which a corresponding ground surface of the bushing is pressed by means of the gland 24 and bolts 25.

In Fig. 4, where the thrust on the shaft is directed, as shown by the arrow, opposite to that in Fig. 1, the fluid cannot enter the space between the rings 18, 19, 20 and 21, the collar 17, the shaft 15, the sleeves 31 and 32, and the housing 23, because of the pressure of the collar 17 on the rings 18, 19, 20 and 21, and of these in turn on the ground surface of the shoulder 33 of the housing 23.

During the rotation of the shaft, oil or other lubricant will run from the cup placed at 40 down into the circular groove 41. From this groove the lubricant will run through the channels 41$^c$ and lubricate the inner bearing surfaces of the rings 18, 19, 20 and 21, as shown in Fig. 1, or the sleeves 31 and 32, as shown in Fig. 4, where they contact with the shaft 15.

The lateral bearing surfaces of the rings 18, 19, 20 and 21, as shown in Fig. 1, will be lubricated by lubricant from the groove 41 which flows through the channels 41$^b$ into the grooves 35 and through the channels 36. The lubricant continues its flow from ring to ring to the collar 17. On the other side of the collar 17 the lateral bearing surfaces of the sleeves 31 and 32 will be lubricated by the fluid which flows from the tank through the channels 42. The fluid which flows from the tank not only lubricates the lateral bearing surfaces of the sleeves 31 and 32, but fills the space between the housing 23 and the bearings 31 and 32, collar 17, the rings 18, 19, 20 and 21, the bushing 22, and the shoulder 33. The fluid is prevented from entering between the lateral bearing surfaces of the rings, the collar, the bushing, and the shoulder because of the close fit between their ground surfaces. The lateral bearing surfaces of the sleeves 31 and 32, as shown in Fig. 4, will be lubricated by lubricant from the groove 41, which flows through the channels 41$^b$. The lubricant which flows from the groove 41 not only lubricates the lateral bearing surfaces of the sleeves 31 and 32, but fills the space between the housing 23 and the bearings 31 and 32, the collar 17, the rings 18, 19, 20 and 21, the bushing 22 and the shoulder 33. The lubricant is prevented from entering between the lateral bearing surfaces of the rings, the collar, the bushing, and the shoulder because of the close fit between their ground surfaces. On the other side of the collar 17 the lateral bearing surfaces of the rings 18, 19, 20 and 21 will be lubricated by the fluid which flows from the tank through the channels 42, and fills the grooves 35 and the channels 36. The fluid from the tank continues its flow from ring to ring to the collar 17, and cannot flow further. The fluid from the tank which flows in the grooves and channels in the rings cannot flow between the ground surfaces of the rings into the space between the housing 23, and the bearings 31 and 32, the collar, the bushing and the shoulder. The pressure exerted by the collar 17 on the rings causes the rings to rotate relative to one another, thereby distributing the lubricant thoroughly.

An alternative embodiment of my invention is shown in Figs. 10, 11, 12, and 13, and is particularly adapted for use with shafts having little or no axial thrust acting thereon. its function being primarily to form a tight joint or packing. The shaft 47 is provided with a collar 48 which is fastened by means of a key 49. A bushing 50 is mounted in an outer housing 51 and held in position by a gland 52 and bolts 53, the housing 51 being provided for this purpose with a shoulder 54 against which the bushing bears. An oil cup is placed at 55 and connects with a circular groove 56 formed in the bushing 50. Channels 57 connect the groove 56 with the bearing surface of the shaft. Channels 58 connect the circular groove 56 with a circular groove 59 formed on the inner lateral face of the bushing 50. Channels 58$^a$ connect the circular groove 56 with the inner edge of the bushing 50 to permit the flow of lubricant to lubricate the inner surfaces of the rings 60 bearing against the rotating shaft 47. As many channels 58 and 58$^a$ as may be desired may be placed in the bushing 50. A pair of rings 60 are mounted on the shaft adjacent to the collar 48 and another pair adjacent to the bushing 50. Between the two pairs of rings 60 another pair of rings 61 is positioned, the rings 61 being held in contact with the adjacent rings 60 by axially elastic springy material 62. The rings 60 on both lateral faces and the rings 61 on one lateral face are each provided with a circular groove 63 which are connected by channels 64 formed in the rings as shown. The grooves 63 are similar to the groove 59 in the bushing 50 and to a groove 65 in the collar 48. The pressure of the springy material 62 holds the rings in sufficiently close contact with each other and with the collar 48 that the tank fluid which surrounds the rings and collar cannot escape. The lubricant from the oil cup placed at 55 flows through the channels 58, the grooves 59 and 63, and the channels 64, and spreads over all of the wearing surfaces.

Alternative forms of ring construction are shown in Figs. 7, 8, and 9, the rings 43 in Fig. 7, having their lateral faces set back inside the grooves 35, thereby connecting the grooves with the inner edge of the rings when assembled. In the rings 44 and 45 shown in Figs. 8 and 9 respectively, the lateral faces of the rings outside of the grooves are set back and thereby connect the grooves 35 and 46 with the exterior of the rings. If desired the channels 35 may be omitted from the construction of rings shown in Fig. 8. The rings 43 are adapted for use where arrangement of the device is as shown in Fig. 1, it there being desirable that the lubricant from the oil cup be permitted to flow freely from the groove 35 into contact with the shaft 15. The rings 44 and 45 are advantageously used where the arrangement of the device is as shown in Fig. 4 in case it is desirable that the lubricating fluid coming from the tank be permitted to flow around and into contact with the shaft 15. The lubricant from the oil cup placed at 40 is permitted to flow freely around the rings and into the grooves 46.

Thus it will be seen that I have provided a packing device for a bearing of the class described which is adapted for a thrust bearing as well as being fluid tight, which is self-adjusting and which, by reason of the novel construction and arrangement of its parts and the provision for the distribution of lubricants, minimizes the power required to overcome friction, and further may be economically constructed and easily assembled.

I claim:

1. In a device of the class described, the combination with a rotatable shaft and a housing having a transversely extending member which has an aperture through which an end of said shaft is extended, of a collar fixedly mounted on the shaft, a plurality of rings mounted on the shaft between the collar and said member, said rings being slidable along and rotatable relative to the shaft, said rings being provided with lubricant-admitting passages intermittently registering with each other, said rings being reduced in width below said passages, and means transmitting an axial thrust to said shaft tending to force said collar towards said member.

2. In a device of the class described, the combination with a rotatable shaft and a housing for the shaft having a transversely extending member which has an aperture through which an end of said shaft is extended, of a collar fixedly mounted on the shaft, means transmitting an axial thrust to the shaft tending to move said collar and shaft towards said member, and a plurality of rings mounted on the shaft between the collar and the transversely extending member, said rings being slidable along and rotatable relative to the shaft, said rings being provided with lubricant-admitting passages intermittently registering with each other, said rings being reduced in width below said passages, the bearing faces of said rings, collar and member being ground and finished whereby said rings form a fluid tight joint between said collar and member.

3. In a device of the class described, the combination with a rotatable shaft and a housing therefor having a pair of spaced apart transversely extending members, which have apertures through which an end of said shaft is extended, of a collar fixedly mounted on the shaft between the transversely extending members, a plurality of pressure rings slidably and rotatably mounted upon the shaft between the collar and one of said transverse members, said rings being provided with lubricant-admitting passages intermittently registering with each other, said rings being reduced in width below said passages, and means mounted on the shaft between the collar and the other of said transversely extending members, adapted to yieldingly force the rings into close contact between the collar and first-mentioned member, the bearing surfaces of said rings, collar and transversely extending members being ground and finished whereby said rings form a fluid tight packing and are rotatable relative to each other.

4. In a device of the class described, the combination with a rotatable shaft and a housing therefor having a pair of spaced apart transversely extending members, which have apertures through which an end of said shaft is extended, of a collar fixedly mounted on the shaft between the transversely extending members, a plurality of pressure rings slidably and rotatably mounted upon the shaft between the collar and one of said transverse members, said rings being provided with lubricant-admitting passages intermittently registering with each other, said rings being reduced in width below said passages, and means mounted on the shaft between the collar and the other of said transversely extending members adapted to yieldingly force the rings into close contact between the collar and first-mentioned member, said means comprising a pair of flanged sleeves rotatable relative to the shaft and having their flanged portions in close contact with the collar and adjacent transverse member respectively, and a resilient member between said sleeves tending to force said sleeves apart.

5. In a device of the class described, the combination with a rotatable shaft and a housing for the shaft having a transversely extending member in which the shaft is journalled, of a collar fixedly mounted on the shaft, means transmitting an axial thrust to the shaft tending to move said collar and shaft towards said member, and a plurality of rings mounted on the shaft between the collar and the transversely extending member, said rings being slidable along and rotatable relative to the shaft, the bearing faces of said rings, collar and member being ground and finished, the lateral bearing faces of said rings, collar and transversely extending member having corresponding concentric circular grooves formed therein, said rings having axially extending channels connecting said grooves, and said transversely extending member having a channel adapted to connect said grooves and channels with a lubricant receptacle formed therein in said member.

6. In a device of the class described, the combination with a rotatable shaft and a housing therefor having a pair of spaced apart transversely extending members in which the shaft is journalled, of a collar fixedly mounted on the shaft between the transversely extending members, a plurality of pressure rings slidably and rotatably mounted upon the shaft between the collar and one of said transverse members and means mounted on the shaft between the collar and the other of said transversely extending members adapted to yieldingly force the rings into close contact between the collar and first mentioned member, the bearing surfaces of said rings, collar and transversely extending members being ground and finished and having corresponding circular grooves formed in their lateral bearing faces, said rings having channels connecting the grooves, and one of said transversely extending members having a channel connecting said grooves with a lubricant receptacle formed therein, and the other of said transversely extending members having a channel extending therethrough and opening into the space between said housing and the exterior of said rings.

7. In a device of the class described, the combination with a rotatable shaft and a housing for the shaft having a transversely extending member in which the shaft is journalled, of a collar fixedly mounted on the shaft, means transmitting an axial thrust to the shaft tending to move said collar and shaft towards said member, and a plurality of rings mounted on the shaft between the collar and the transversely extending member, said rings being slidable along and rotatable relative to the shaft, the bearing faces of said rings, collar and member being ground and finished, the lateral bearing faces of said rings, collar and transversely extending member having corresponding concentric circular grooves formed therein, said rings having axially extending channels connecting said grooves, and said transversely extending member having a channel adapted to connect said grooves and channels with a lubricant receptacle formed therein, the thickness of said rings outside and inside of said grooves being different.

8. In a device of the class described, the combination of a member forming a housing, a shaft extending through said housing, a collar fixedly secured to said shaft, rings movably mounted upon said shaft, and means transmitting an axial thrust to said shaft toward said collar provided upon said shaft, to thereby cause said collar and rings to cooperate to take the thrust and provide a packing to prevent leakage between the shaft and housing, said rings being provided with intermittently registering openings admitting lubricant to the thrust collar, said rings being reduced in width below said openings.

In witness whereof, I hereunto subscribe my name this 4th day of October, A. D., 1923.

OLE G. HALVORSEN.